US008942975B2

(12) United States Patent
Borgstrom

(10) Patent No.: US 8,942,975 B2
(45) Date of Patent: Jan. 27, 2015

(54) NOISE SUPPRESSION IN A MEL-FILTERED SPECTRAL DOMAIN

(75) Inventor: Jonas Borgstrom, Santa Monica, CA (US)

(73) Assignee: Broadcom Corporation, Irvine, CA (US)

( * ) Notice: Subject to any disclaimer, the term of this patent is extended or adjusted under 35 U.S.C. 154(b) by 865 days.

(21) Appl. No.: 13/069,089

(22) Filed: Mar. 22, 2011

(65) Prior Publication Data

US 2012/0116754 A1 May 10, 2012

Related U.S. Application Data

(60) Provisional application No. 61/412,243, filed on Nov. 10, 2010.

(51) Int. Cl.

| | |
|---|---|
| ***G10L 21/00*** | (2013.01) |
| ***G10L 21/0208*** | (2013.01) |
| *G10L 15/00* | (2013.01) |
| *H04B 1/10* | (2006.01) |
| *H04B 1/00* | (2006.01) |

(52) U.S. Cl.

CPC .................................. *G10L 21/0208* (2013.01)
USPC ........... 704/205; 704/500; 704/234; 704/214; 704/221; 704/256; 455/296; 375/133

(58) Field of Classification Search

USPC ......... 704/205, 200, 233, 236, 231, 221, 207, 704/214, 234, 226, 256, 500; 375/133; 455/296

See application file for complete search history.

(56) References Cited

U.S. PATENT DOCUMENTS

| | | | | |
|---|---|---|---|---|
| 5,862,519 | A * | 1/1999 | Sharma et al. | 704/231 |
| 6,098,040 | A * | 8/2000 | Petroni et al. | 704/234 |
| 6,411,925 | B1 * | 6/2002 | Keiller | 704/200 |
| 6,859,773 | B2 * | 2/2005 | Breton | 704/226 |
| 7,349,844 | B2 * | 3/2008 | Staiger | 704/231 |
| 8,229,744 | B2 * | 7/2012 | Dharanipragada et al. | 704/256 |
| 8,775,168 | B2 * | 7/2014 | Muralidhar et al. | 704/214 |
| 2004/0148160 | A1 * | 7/2004 | Ramabadran | 704/221 |
| 2004/0158465 | A1 * | 8/2004 | Rees | 704/233 |
| 2008/0172233 | A1 * | 7/2008 | Smaragdis et al. | 704/256 |
| 2009/0006102 | A1 * | 1/2009 | Kan et al. | 704/500 |
| 2009/0017784 | A1 * | 1/2009 | Dickson et al. | 455/296 |
| 2009/0144053 | A1 * | 6/2009 | Tamura et al. | 704/207 |
| 2010/0280827 | A1 * | 11/2010 | Mukerjee et al. | 704/236 |

OTHER PUBLICATIONS

McAulay et al., "Speech Enhancement Using a Soft-Decision Noise Suppression Filter", IEEE transactions on Acoustics, Speech, and Signal Processing ,vol. Assp-28, No. 2, Apr. 1980, pp. 137-145.

(Continued)

*Primary Examiner* — Paras D Shah
*Assistant Examiner* — Neeraj Sharma
(74) *Attorney, Agent, or Firm* — Fiala & Weaver P.L.L.C.

(57) ABSTRACT

Techniques are described herein that suppress noise in a Mel-filtered spectral domain. For example, a window may be applied to a representation of a speech signal in a time domain. The windowed representation in the time domain may be converted to a subsequent representation of the speech signal in the Mel-filtered spectral domain. A noise suppression operation may be performed with respect to the subsequent representation to provide noise-suppressed Mel coefficients.

20 Claims, 7 Drawing Sheets

(56) References Cited

OTHER PUBLICATIONS

Ephraim et al., "Speech Enhancement Using a Minimum Mean-Square Error Short-Time, Spectral Amplitude Estimator", IEEE transactions on Acoustics, Speech, and Signal Processing, vol. Assp-32, No. 6, Dec. 1984, pp. 1109-1121.

Ephraim et al., "Speech enhancement using a minimum mean-square error log-spectral amplitude estimator", IEEE Transactions on Acoustics, Speech, and Signal Processing, vol. assp-33, No. 2, Apr. 1985, pp. 443-445.

Boll, "A Spectral Subtraction Algorithm for Suppression of Acoustic Noise in Speech", IEEE International Conference on Acoustics, Speech, and Signal Processing, Apr. 1979, pp. 200-203.

Zhu et al., "Non-linear feature extraction for robust speech recognition in stationary and non-stationary noise", Academic Press, Computer Speech and Language, vol. 17, Mar. 22, 2003, pp. 381-402.

* cited by examiner

NOISE SUPPRESSION IN A MEL-FILTERED SPECTRAL DOMAIN

CROSS-REFERENCE TO RELATED APPLICATIONS

This application claims the benefit of U.S. Provisional Application No. 61/412,243, filed Nov. 10, 2010, the entirety of which is incorporated by reference herein.

BACKGROUND OF THE INVENTION

1. Field of the Invention

The invention generally relates to noise suppression.

2. Background

Speech recognition (a.k.a. automatic speech recognition) techniques use a person's speech to perform operations such as composing a document, dialing a telephone number, controlling a processing system (e.g., a computer), etc. The person's speech typically is sampled to provide speech samples. The speech samples are compared to reference samples to determine the content of the speech (i.e., what the person is saying). For example, each reference sample may represent a word or a phoneme. By identifying the words or phonemes that correspond to the speech samples, the content of the speech may be determined.

Each of the speech samples and the reference samples commonly has a speech component and a noise component. The speech component represents the person's speech. The noise component represents sounds other than the person's speech (e.g., background noise). It may be desirable to suppress the effect of the noise components (referred to herein as "noise") to more effectively match the speech samples to the reference samples.

However, conventional techniques for suppressing noise in speech samples and reference samples often are computationally complex, which may render such techniques infeasible for resource-constrained applications. For example, front end spectral enhancement techniques traditionally are built upon statistical or subspace approaches, which may be computationally intensive. Moreover, noise robust processing traditionally is performed in the linear frequency domain. Such processing becomes relatively complex when spectral analysis is performed at relatively high resolutions.

BRIEF SUMMARY OF THE INVENTION

A system, method, and/or computer program product for suppressing noise in a Mel-filtered spectral domain, substantially as shown in and/or described in connection with at least one of the figures, as set forth more completely in the claims.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
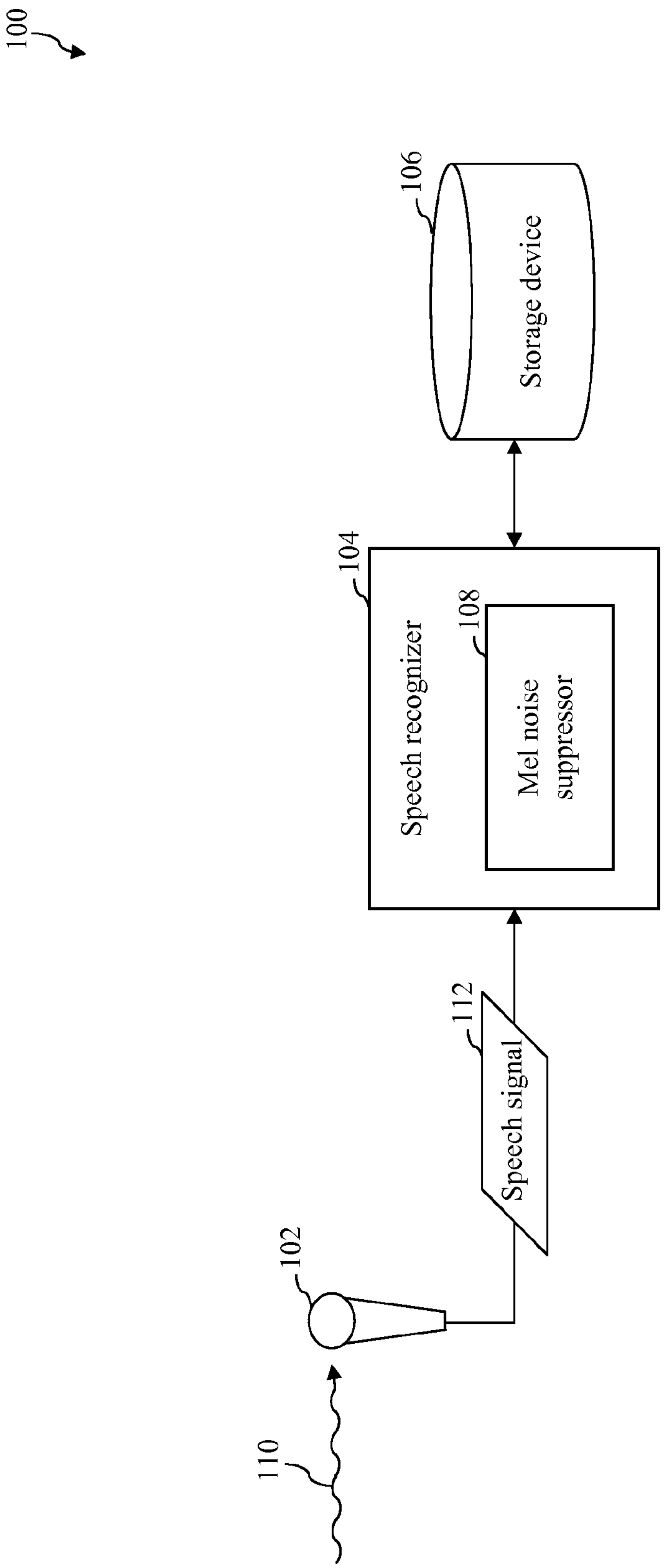
FIG. 1 depicts an example automatic speech recognition system in accordance with an embodiment described herein.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate example embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Various approaches are described herein for, among other things, suppressing noise in a Mel-filtered spectral domain. An example method is described in which a window is applied to a first representation of a speech signal in a time domain to provide a windowed representation of the speech signal. The speech signal represents speech. The windowed representation of the speech signal in the time domain is converted to a second representation of the speech signal in a frequency domain. The second representation of the speech signal in the frequency domain is converted to a third representation of the speech signal in a Mel-filtered spectral domain. A noise suppression operation is performed with respect to the third representation of the speech signal in the Mel-filtered spectral domain to provide a noise-suppressed representation of the speech signal that includes noise-suppressed Mel coefficients.

An example automatic speech recognition system is described that includes a windowing module, a conversion module, and a Mel noise suppressor. The windowing module is configured to apply a window to a first representation of a speech signal in a time domain to provide a windowed representation of the speech signal. The speech signal represents speech. The conversion module is configured to convert the windowed representation of the speech signal in the time domain to a second representation of the speech signal in a frequency domain. The conversion module is further configured to convert the second representation of the speech signal in the frequency domain to a third representation of the speech signal in a Mel-filtered spectral domain. The Mel noise suppressor is configured to perform a noise suppression operation with respect to the third representation of the speech signal in the Mel-filtered spectral domain to provide a noise-suppressed representation of the speech signal that includes noise-suppressed Mel coefficients.

An example computer program product is described that includes a computer-readable medium having computer program logic recorded thereon for enabling a processor-based system to perform noise suppression in a Mel-filtered spectral domain. The computer program product includes first, second, third, and fourth program logic modules. The first program logic module is for enabling the processor-based system to apply a window to a first representation of a speech signal in a time domain to provide a windowed representation of the speech signal. The speech signal represents speech. The second program logic module is for enabling the processor-based system to convert the windowed representation of the speech signal in the time domain to a second representation of the speech signal in a frequency domain. The third program logic module is for enabling the processor-based system to convert the second representation of the speech signal in the frequency domain to a third representation of the speech signal in the Mel-filtered spectral domain. The fourth program logic module is for enabling the processor-based system to perform a noise suppression operation with respect to the third representation of the speech signal in the Mel-filtered spectral domain to provide a noise-suppressed representation of the speech signal that includes noise-suppressed Mel coefficients.

The noise suppression techniques described herein have a variety of benefits as compared to conventional noise suppression techniques. For example, the noise suppression techniques described herein may provide noise robust automatic speech recognition performance while inducing a relatively low computational load. In accordance with the noise suppression techniques described herein, filtering in the Mel-filtered spectral domain may be performed with respect to fewer channels than filtering in the linear frequency domain, thus reducing computational complexity. The noise suppression techniques described herein are applicable to any device (e.g., a resource-constrained device, such as a Bluetooth®-enabled device) for which human-computer-interaction (HCI) may be enhanced or supplemented by automatic speech recognition.

II. Example Embodiments

FIG. 1 depicts an example automatic speech recognition system 100 in accordance with an embodiment described herein. Generally speaking, automatic speech recognition system 100 operates to determine content of a person's speech. Automatic speech recognition system 100 includes a microphone 102, a speech recognizer 104, and a storage device 106. Microphone 102 converts speech 110 to a speech signal 112. For instance, microphone 102 may process varying pressure waves that are associated with the speech 110 to generate the speech signal 112. The speech signal 112 may be any suitable type of signal, such as an electrical signal, a magnetic signal, an optical signal, or any combination thereof. For instance, the speech signal 112 may be a digital signal or an analog signal.

Storage device 106 stores audio data samples. Each audio data sample may represent one or more words, one or more phonemes, etc. A phoneme is one speech sound in a set of speech sounds of a language that serve to distinguish a word in that language from another word in that language.

Speech recognizer 104 samples the speech signal 112 to provide speech samples. Speech recognizer 104 compares the speech samples to the audio data samples that are stored by storage device 106 to determine which audio data samples correspond to the speech samples. Speech recognizer 104 may analyze each speech sample in the context of other speech samples (e.g., using a Hidden Markov Model or a neural network) to determine the audio data sample that corresponds to that speech sample. Speech recognizer 104 may determine a probability that each audio data sample corresponds to each speech sample. For instance, speech recognizer 104 may determine that a specified audio data sample corresponds to a specified speech sample based on the probability that the specified audio data sample corresponds to the specified speech sample being greater than the probabilities that audio data samples other than the specified audio data sample correspond to the specified speech sample.

Speech recognizer 104 includes a Mel noise suppressor 108. A Mel noise suppressor is a noise suppressor that is capable of performing a noise suppression operation in the Mel-filtered spectral domain. Mel noise suppressor 108 suppresses noise that is included in the speech signal 112. In particular, Mel noise suppressor 108 performs a noise suppression operation with respect to the speech samples in the Mel-filtered spectral domain before the speech samples are compared to the audio data samples that are stored by storage device 106. Mel noise suppressor 108 may also suppress noise that is included in the audio data samples, though the scope of the embodiments is not limited in this respect.

In an example embodiment, automatic speech recognition system 100 is implemented as a processing system. An example of a processing system is a system that includes at least one processor that is capable of manipulating data in accordance with a set of instructions. For instance, a processing system may be a computer, a personal digital assistant, a portable music device, a portable gaming device, a remote control, etc.

Figure 2A:
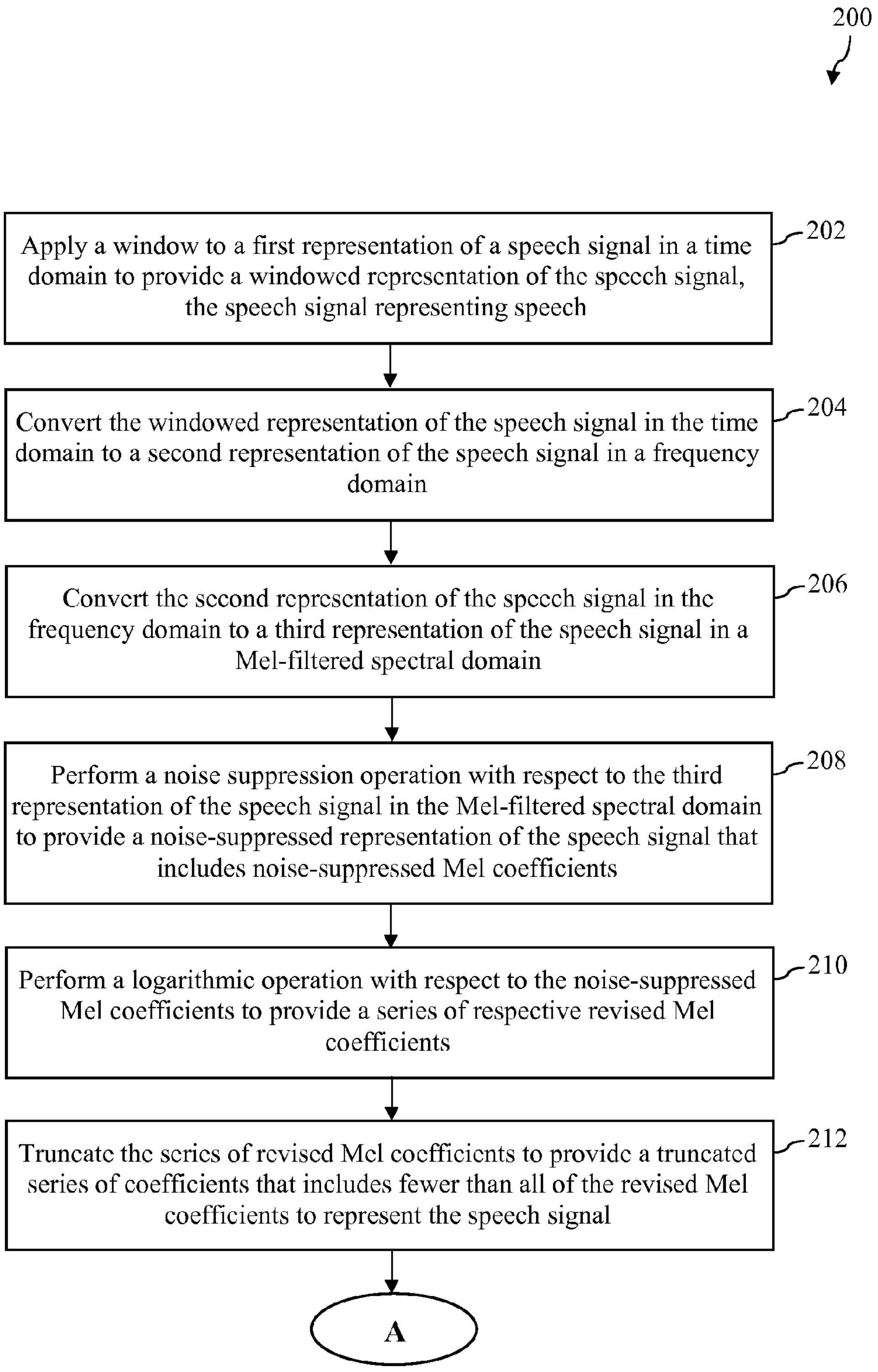
FIGS. 2A and 2B depict respective portions of a flowchart of an example method for representing speech in a Mel-filtered spectral domain in accordance with an embodiment described herein.
Figure 2B:
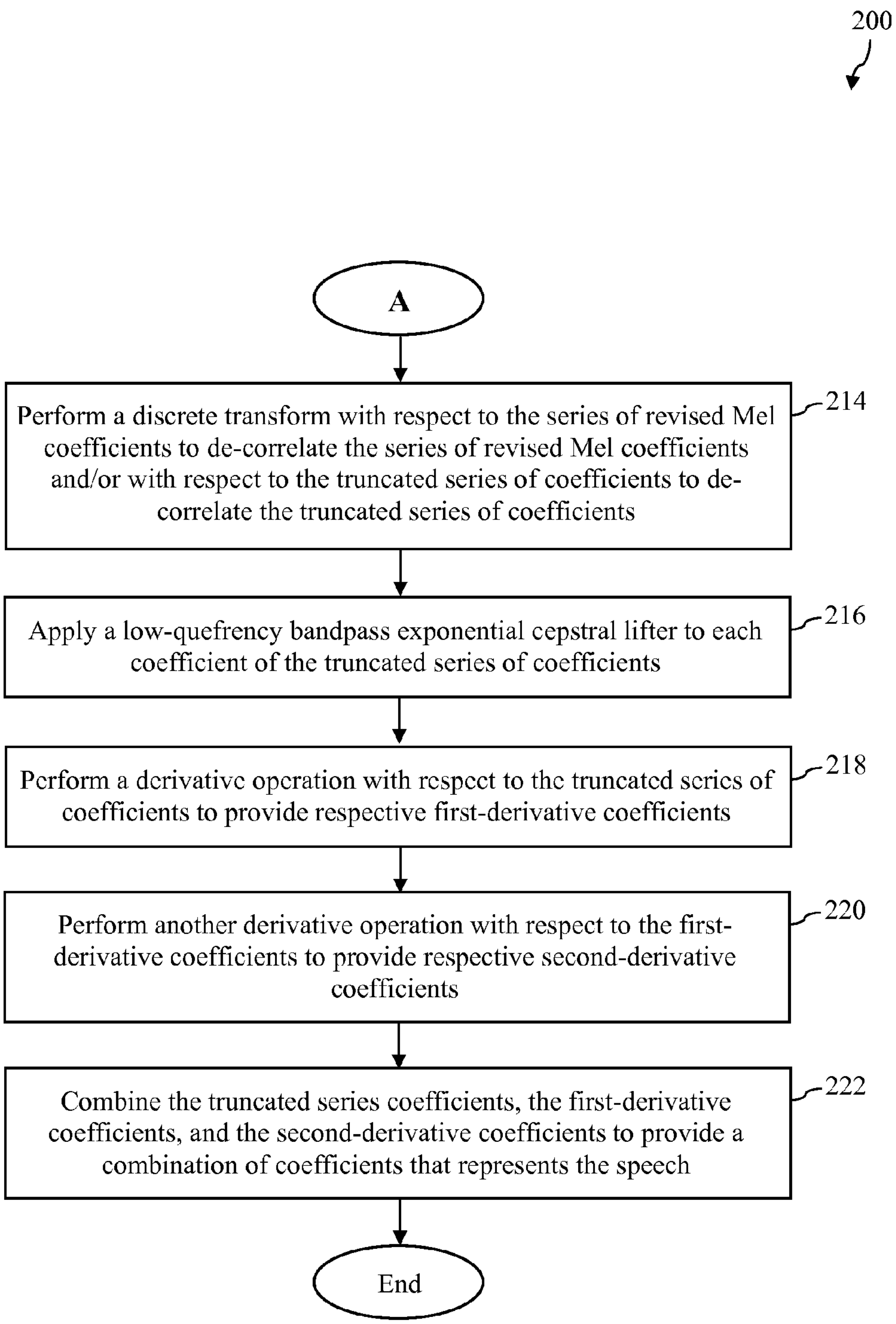
Figure 3:
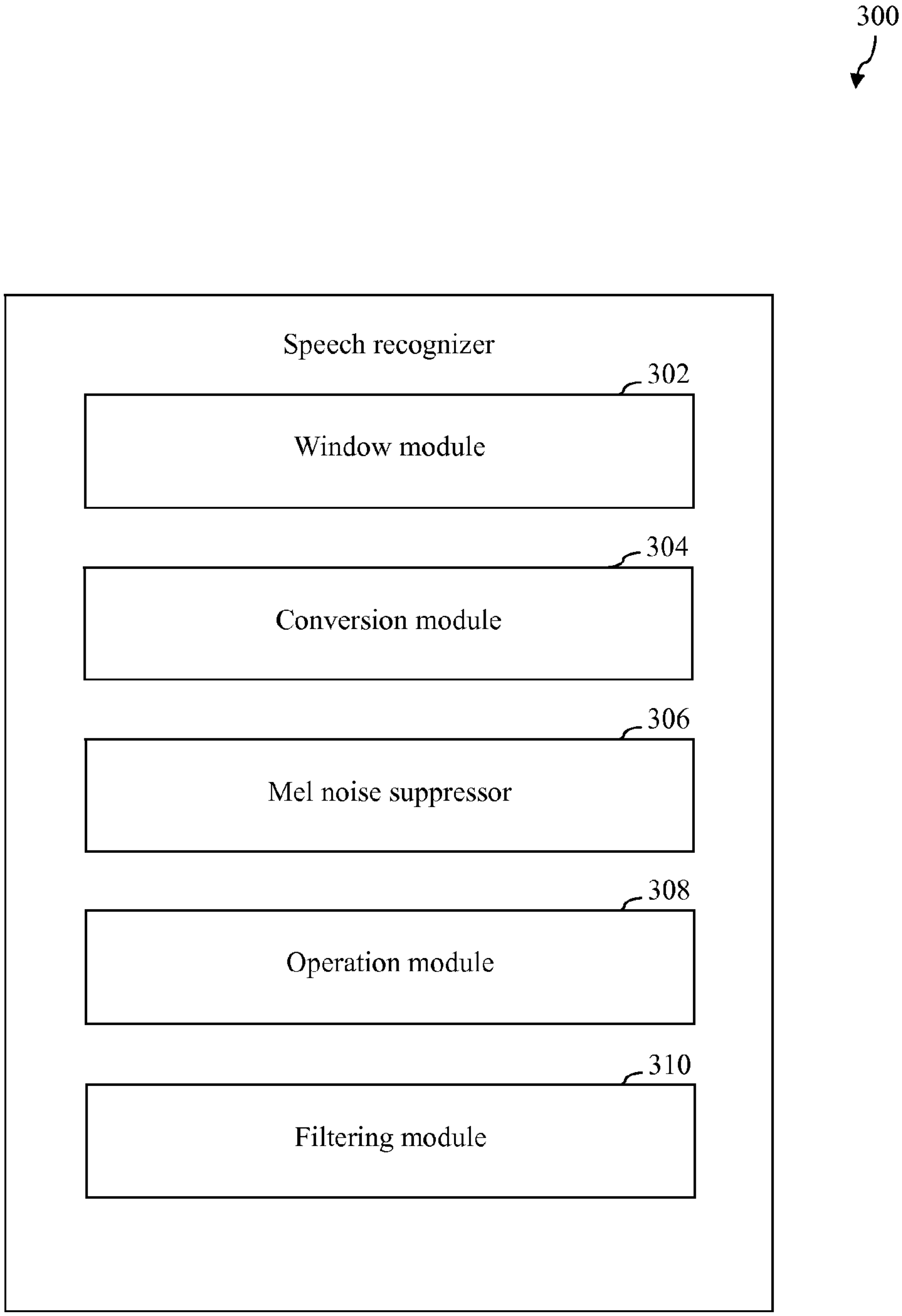
FIG. 3 is a block diagram of an example implementation of a speech recognizer shown in FIG. 1 in accordance with an embodiment described herein.

FIGS. 2A and 2B depict respective portions of a flowchart 200 of an example method for representing speech in a Mel-filtered spectral domain in accordance with an embodiment described herein. Flowchart 200 may be performed by speech recognizer 104 of automatic speech recognition system 100 shown in FIG. 1, for example. For illustrative purposes, flowchart 200 is described with respect to a speech recognizer 300 shown in FIG. 3, which is an example of a speech recognizer 104, according to an embodiment. As shown in FIG. 3, speech recognizer 300 includes a window module 302, a conversion module 304, a Mel noise suppressor 306, an operation module 308, and a filtering module 310. Further structural and operational embodiments will be apparent to persons skilled in the relevant art(s) based on the discussion regarding flowchart 200.

As shown in FIG. 2A, the method of flowchart 200 begins at step 202. In step 202, a window is applied to a first representation of a speech signal in a time domain to provide a windowed representation of the speech signal. The window may be any suitable type of window, such as a Hamming window. The speech signal represents speech. In an example implementation, window module 302 applies the window to the first representation of the speech signal in the time domain.

In an example embodiment, step 202 is performed iteratively on a frame-by-frame basis with respect to the speech signal, such that each windowed representation corresponds to a respective frame of the speech signal. Moreover, steps 204, 206, 208, 210, 212, 214, 216, 218, 220, and 222, all of which are described in detail below, may be performed iteratively, such that the aforementioned steps are performed for each frame of the speech signal.

In accordance with another example embodiment, the windowed representation of the speech signal is divided into a plurality of channels. For purposes of illustration, the number of channels is represented as $N_{ch}$. The windowed representation is characterized by the following equation:

$$E[X_k(n)]=E[S_k(n)]+E[N_k(n)],\ \text{for } 1\le k\le N_{ch} \qquad \text{Equation 1}$$

The windowed representation of the speech signal may be described in terms of observed power spectra, denoted as $X_k$ in Equation 1. The speech signal may include corruptive noise in addition to the underlying clean speech. Accordingly, in Equation 1, $N_k$ represents power spectra corresponding to the corruptive noise, and $S_k$ represents power spectra corresponding to the underlying clean speech. k denotes a channel index, such that each channel of the windowed representation corresponds to a respective integer value of k. n denotes a time index, such that each windowed representation (e.g., frame) of the speech signal corresponds to a respective integer value of n.

At step 204, the windowed representation of the speech signal in the time domain is converted to a second representation of the speech signal in a frequency domain. For instance, the windowed representation may be converted to the second representation using any suitable type of transform, such as a Fourier transform. In an example implementation, conversion module 304 converts the windowed representation of the speech signal in the time domain to the second representation of the speech signal in the frequency domain.

At step 206, the second representation of the speech signal in the frequency domain is converted to a third representation of the speech signal in a Mel-filtered spectral domain. In an example implementation, conversion module 304 coverts the second representation of the speech signal in the frequency domain to the third representation of the speech signal in the Mel-filtered spectral domain.

In accordance with an example embodiment, the third representation of the speech signal is characterized by the following equation:

$$E[X_m^{mel}(n)]=E[S_m^{mel}(n)]+E[N_m^{mel}(n)],\ \text{for } 1\le m\le N_m \qquad \text{Equation 2}$$

with each value of $E[X_m^{mel}(n)]$ representing a respective Mel coefficient. $N_m$ denotes the number of Mel channels used for integer value of n. $N_m$ may be selected to be less than $N_{ch}$ to reduce computational complexity with regard to suppressing the noise that is associated with the speech signal. For instance, if $N_{ch}$=127, then $N_m$ may be set equal to a value such as 23 or 26. These values for $N_{ch}$ and $N_m$ are provided for illustrative purposes and are not intended to be limiting. It will be recognized that $N_{ch}$ and $N_m$ may be any suitable values.

At step 208, a noise suppression operation is performed with respect to the third representation of the speech signal in the Mel-filtered spectral domain to provide a noise-suppressed representation of the speech signal that includes noise-suppressed Mel coefficients. For example, the noise suppression operation may be performed with respect to a plurality of Mel coefficients in the third representation. In accordance with this example, the noise-suppressed Mel coefficients in the noise-suppressed representation of the speech signal may correspond to the respective Mel coefficients in the third representation of the speech signal. In an example implementation, Mel noise suppression module 306 performs the noise suppression operation with respect to the third representation of the speech signal in the Mel-filtered spectral domain to provide the noise-suppressed representation of the speech signal.

At step 210, a logarithmic operation is performed with respect to the noise-suppressed Mel coefficients to provide a series of respective revised Mel coefficients. In an example implementation, operation module 308 performs the logarithmic operation with respect to the noise-suppressed Mel coefficients to provide the series of respective revised Mel coefficients.

At step 212, the series of revised Mel coefficients is truncated to provide a truncated series of coefficients (a.k.a. Mel frequency cepstral coefficients) that includes fewer than all of the revised Mel coefficients to represent the speech signal. For instance, a subset of the revised Mel coefficients that is not included in the truncated series of coefficients may provide a negligible amount (e.g., 2%, 5%, or 10%) of information, as compared to a subset of the revised Mel coefficients that is included in the truncated series of coefficients. As an example, if the series of revised Mel coefficients includes 26 Mel coefficients, the truncated series of coefficients may include thirteen coefficients. The number of revised Mel coefficients and the number of coefficients in the truncated series of coefficients mentioned above are provided for illustrative purposes and are not intended to be limiting. It will be recognized that the series of revised Mel coefficients may include any suitable number of revised Mel coefficients. It will be further recognized that the truncated series of coefficients may include any suitable number of coefficients, so long as the number of coefficients in the truncated series of coefficients is less than the number of revised Mel coefficients. In an example implementation, operation module 308 truncates the series of revised Mel coefficients to provide the truncated series of coefficients to represent the speech signal. Upon completion of step 212, flow continues to step 214, which is shown in FIG. 2B.

At step 214, a discrete transform is performed with respect to the series of revised Mel coefficients to de-correlate the series of revised Mel coefficients and/or with respect to the truncated series of coefficients to de-correlate the truncated series of coefficients. For instance, the discrete transform may be any suitable type of transform, such as a discrete cosine transform or an inverse discrete cosine transform. Correlation refers to the extent to which coefficients are linearly associated. Accordingly, de-correlating coefficients causes the coefficients to become less linearly associated. For instance, de-correlating the coefficients may cause each of the coefficients to be projected onto a different space, such that knowledge of a coefficient does not provide information regarding another coefficient. In an example implementation, conversion module 304 performs the discrete transform with respect to the series of revised Mel coefficients to de-correlate the series of revised Mel coefficients and/or with respect to the truncated series of coefficients to de-correlate the truncated series of coefficients.

At step 216, a low-quefrency bandpass exponential cepstral lifter is applied to each coefficient of the truncated series of coefficients. For instance, the low-quefrency bandpass exponential cepstral lifter may be applied to emphasize log-spectral components that oscillate relatively slowly with respect to frequency. Such log-spectral components may provide discriminative information for automatic speech recognition. In an example implementation, filtering module 310 applies the low-quefrency bandpass exponential cepstral lifter to each coefficient of the truncated series of coefficients.

In an example embodiment, the low-quefrency bandpass exponential cepstral lifter is characterized by the following equation:

$$\omega(k) = 1 + \frac{D}{2}\sin\left(\frac{\pi * k}{D}\right), \text{ for } 1 \le k \le N_{cep} \quad \text{Equation 3}$$

$N_{cep}$ represents a number of coefficients in the truncated series of coefficients. D is a constant that may be set to accommodate given circumstances. D may be set to equal 22, for example, though it will be recognized that D may be any suitable value. In accordance with this embodiment, the lifter ω(k) is applied in the cepstral domain as:

$$\hat{c}(k)=\omega(k)*c(k) \quad \text{Equation 4}$$

where c(k) represent a respective coefficient of the truncated series of coefficients.

At step 218, a derivative operation is performed with respect to the truncated series of coefficients to provide respective first-derivative coefficients. For instance, a derivative of a first coefficient may be defined as a difference between the first coefficient and a second coefficient; a derivative of the second coefficient may be defined as a difference between the second coefficient and a third coefficient, and so on. In an example implementation, operation module 308 performs the derivative operation with respect to the truncated series of coefficients to provide the respective first-derivative coefficients.

At step 220, another derivative operation is performed with respect to the first-derivative coefficients to provide respective second-derivative coefficients. In an example implementation, operation module 308 performs another derivative operation with respect to the first-derivative coefficients to provide the respective second-derivative coefficients.

At step 222, the truncated series coefficients, the first-derivative coefficients, and the second-derivative coefficients are combined to provide a combination of coefficients that represents the speech. In an example implementation, operation module 308 combines the truncated series coefficients, the first-derivative coefficients, and the second-derivative coefficients to provide the combination of coefficients that represents the speech.

In some example embodiments, one or more steps 202, 204, 206, 208, 210, 212, 214, 216, 218, 220, and/or 222 of flowchart 200 may not be performed. Moreover, steps in addition to or in lieu of steps 202, 204, 206, 208, 210, 212, 214, 216, 218, 220, and/or 222 may be performed. Furthermore, one or more steps 202, 204, 206, 208, 210, 212, 214, 216, 218, 220, and/or 222 may be performed iteratively for respective windowed representations of the speech signal. For instance, the step(s) may be performed for a first windowed representation that corresponds to a first time period, again for a second windowed representation that corresponds to a second time period, again for a third windowed representation that corresponds to a third time period, and so on. The first, second, third, etc. time periods may be successive time periods. The time periods may overlap, though the scope of the embodiments is not limited in this respect. Each time period may be any suitable duration, such as 80 microseconds, 20 milliseconds, etc. In accordance with an embodiment, each of the windowed representations corresponds to a respective integer value of the time index n, as described above with reference to Equations 1 and 2.

It will be recognized that speech recognizer 300 may not include one or more of window module 302, conversion module 304, Mel noise suppressor 306, operation module 308, and/or filtering module 310. Furthermore, speech recognizer 300 may include modules in addition to or in lieu of window module 302, conversion module 304, Mel noise suppressor 306, operation module 308, and/or filtering module 310.

Figure 4:
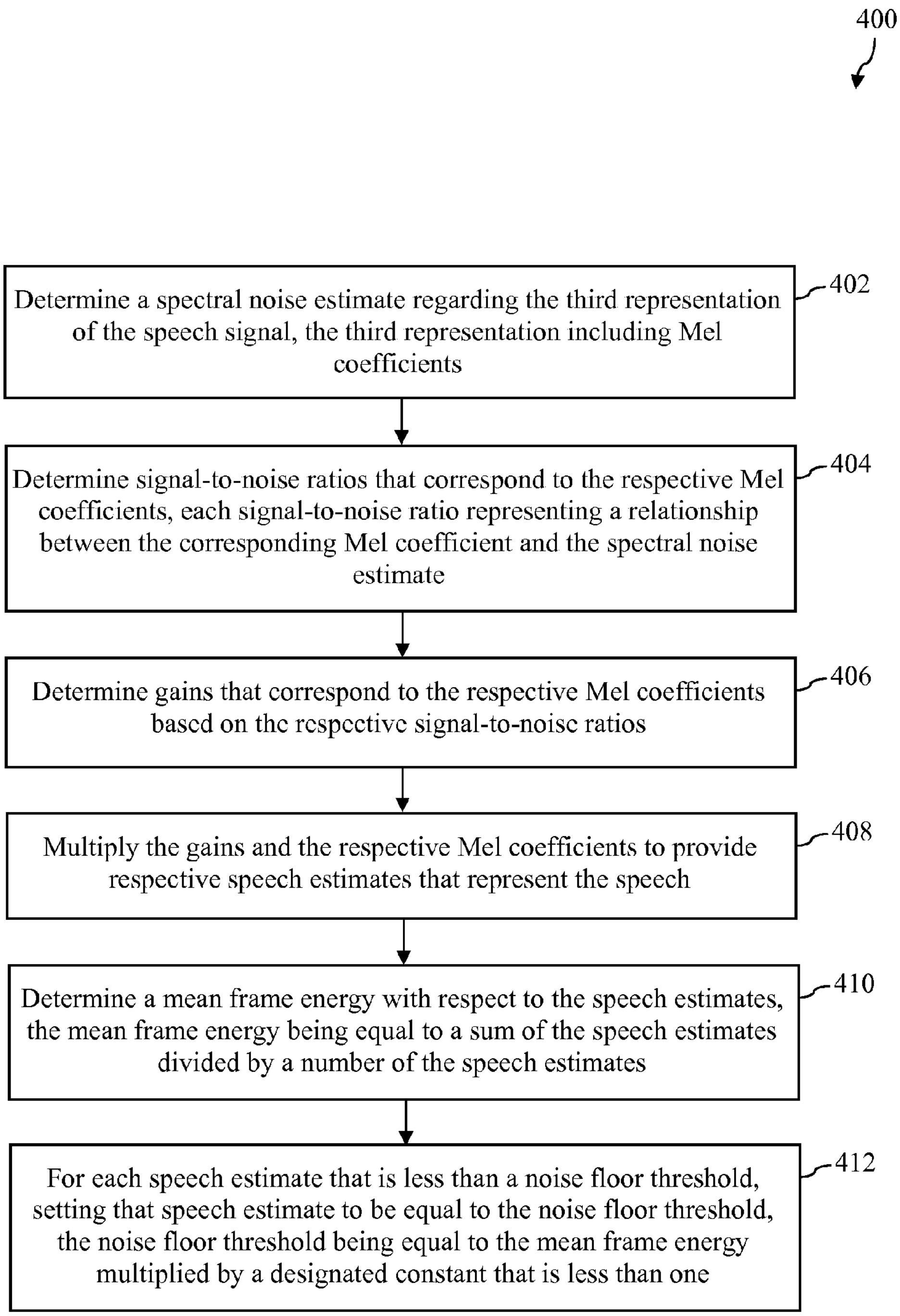
FIG. 4 depicts a flowchart of an example method for suppressing noise in a Mel-filtered spectral domain in accordance with an embodiment described herein.
Figure 5:
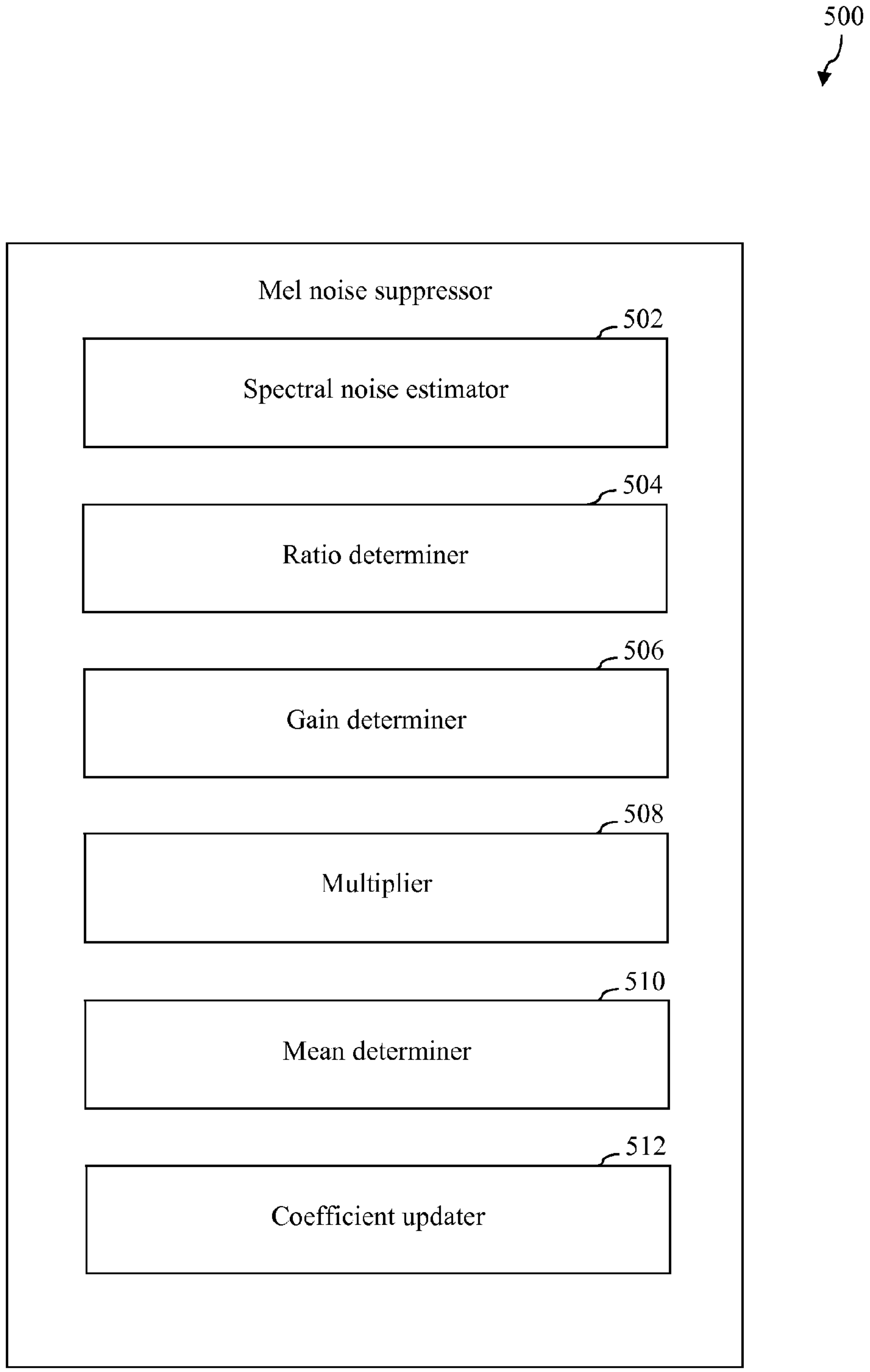
FIG. 5 is a block diagram of an example implementation of a Mel noise suppressor shown in FIG. 1 or 3 in accordance with an embodiment described herein.

FIG. 4 depicts a flowchart 400 of an example implementation of step 208 of flowchart 200 shown in FIG. 2 in accordance with an embodiment described herein. Flowchart 400 may be performed by Mel noise suppressor 108 of automatic speech recognition system 100 shown in FIG. 1 and/or by Mel noise suppressor 306 of speech recognizer 300 shown in FIG. 3, for example. For illustrative purposes, flowchart 400 is described with respect to a Mel noise suppressor 500 shown in FIG. 5, which is an example of a Mel noise suppressor 108 or 306, according to an embodiment. As shown in FIG. 5, Mel noise suppressor 500 includes a spectral noise estimator 502, a ratio determiner 504, a gain determiner 506, a multiplier 508, a mean determiner 510, and a coefficient updater 512. Further structural and operational embodiments will be apparent to persons skilled in the relevant art(s) based on the discussion regarding flowchart 400.

As shown in FIG. 4, the method of flowchart 400 begins at step 402. In step 402, a spectral noise estimate regarding the third representation of the speech signal is determined. The third representation includes Mel coefficients. In an example implementation, spectral noise estimator 502 determines the spectral noise estimate regarding the third representation of the speech signal.

In an example embodiment, the spectral noise estimate is based on a running average of an initial subset of the Mel coefficients. The initial subset of the Mel coefficients may correspond to an initial subset of the frames of the speech signal. For instance, it may be assumed that the initial subset of the frames represents inactive speech. In an aspect, the initial subset of the frames includes $N_s$ frames. Each of the $N_s$ frames includes $N_m$ Mel channels. Each Mel channel corresponds to a respective Mel coefficient $E[X_m^{mel}(n)]$, as described above with reference to Equation 2. In accordance with this aspect, the spectral noise estimate is characterized by the following equation:

$$\hat{N}_m^{mel}(n)=\beta_{NE}(n)\hat{N}_m^{mel}(n-1)+(1-\beta_{NE}(n))X_m^{mel}(n), \text{ if } 1\le n\le N_s$$

$$\hat{N}_m^{mel}(N_s), \text{ if } n>N_s \quad \text{Equation 5}$$

In further accordance with this aspect, $\beta_{NE}$ is a frame-dependent forgetting factor, which may be expressed as:

$$\beta_{NE}(n) = \frac{n-1}{n} \quad \text{Equation 6}$$

Each of the forgetting factors may be hard-coded to reduce computational complexity, though the scope of the embodiments is not limited in this respect.

At step 404, signal-to-noise ratios that correspond to the respective Mel coefficients are determined Each signal-to-noise ratio represents a relationship between the corresponding Mel coefficient and the spectral noise estimate. In an example implementation, ratio determiner 504 determines the signal-to-noise ratios that correspond to the respective Mel coefficients.

In an example embodiment, each signal-to-noise ratio is a Mel-domain a posteriori signal-to-noise ratio. In accordance with this embodiment, each signal-to-noise ratio may be expressed as:

$$\gamma_m^{mel} = \frac{X_m^{mel}}{\hat{N}_m^{mel}} \quad \text{Equation 7}$$

At step 406, gains that correspond to the respective Mel coefficients are determined based on the respective signal-to-noise ratios. In an example implementation, gain determiner 506 determines the gains that correspond to the respective Mel coefficients.

In an example embodiment, each gain is substantially equal to a fixed maximum gain if the corresponding signal-to-noise ratio is greater than an upper signal-to-noise threshold. In accordance with this embodiment, each gain is substantially equal to a fixed minimum gain if the corresponding signal-to-noise ratio is less than a lower signal-to-noise threshold. In further accordance with this embodiment, each gain is based on a polynomial (e.g., binomial, trinomial, etc.) function of the corresponding signal-to-noise ratio if the corresponding signal-to-noise ratio is less than the upper signal-to-noise threshold and greater than the lower signal-to-noise threshold.

In one aspect, the gains may be characterized by the following equation:

$$G(\gamma_m^{mel}) = G_{max}, \text{ if } \gamma_m^{mel} > \gamma_{max}^{mel}$$

$$G_{min}, \text{ if } \gamma_m^{mel} < \gamma_{min}^{mel}$$

$$a_0 + a_1 * \gamma_m^{mel} + a_2 * (\gamma_m^{mel})^2, \text{ else} \quad \text{Equation 8}$$

$G_{min}$, $G_{max}$, $\gamma_{min}^{mel}$, and $\gamma_{max}^{mel}$ may be set to accommodate given circumstances. For example, $G_{min}$ may be set to equal a non-zero value that is less than one to reduce artifacts that may occur if $G_{min}$ is set to equal zero. In accordance with this example, setting $G_{min}$ may involve a trade-off between reducing the aforementioned artifacts and applying a greater amount of attenuation.

In accordance with this aspect, the following equations apply:

$$G(\gamma_{min}^{mel}) = G_{min} \quad \text{Equation 9}$$

$$G(\gamma_{max}^{mel}) = G_{max} \quad \text{Equation 10}$$

$$\frac{\partial}{\partial \gamma_m^{mel}} G(\gamma_{max}^{mel}) = 0 \quad \text{Equation 11}$$

Solving Equation 8 for $a_0$, $a_1$, and $a_2$ provides the following equations:

$$a_2 = \frac{-(G_{max} - G_{min})}{2G_{max}(G_{max} - G_{min}) - (G_{max}^2 - G_{min}^2)} \quad \text{Equation 12}$$

$$a_1 = -G_{max} * a_2 \quad \text{Equation 13}$$

$$a_0 = G_{max} - G_{max} * a_1 - G_{max}^2 * a_2 \quad \text{Equation 14}$$

In one example implementation, $G_{min}$=0.25, $G_{max}$=1.0, $\gamma_{min}^{mel}$=0.5, $\gamma_{max}^{mel}$=5.0, $a_0$=0.07407, $a_1$=0.37037, and $a_2$=−0.03704. These example values are provided for illustrative purposes and are not intended to be limiting. Any suitable values may be used.

At step 408, the gains and the respective Mel coefficients are multiplied to provide respective speech estimates that represent the speech. In an example implementation, multiplier 508 multiplies the gains and the respective Mel coefficients to provide the respective speech estimates.

In accordance with an example embodiment, the speech estimates may be characterized by the following equation:

$$\hat{S}_m = G_m * X_m \quad \text{Equation 15}$$

where $G_m$ is shorthand for $G(\gamma_m^{mel})$.

At step 410, a mean frame energy is determined with respect to the speech estimates. The mean frame energy is equal to a sum of the speech estimates divided by a number of the speech estimates. In an example implementation, mean determiner 510 determines the mean frame energy.

In an example embodiment, the mean frame energy is determined in accordance with the following equation:

$$\overline{E} = \frac{\sum_{m=1}^{N_m} (\hat{s}_m)}{N_m} \quad \text{Equation 16}$$

At step 412, each speech estimate that is less than a noise floor threshold is set to be equal to the noise floor threshold. The noise floor threshold is equal to the mean frame energy multiplied by a designated constant that is less than one. In an example implementation, coefficient updater 512 sets each speech estimate that is less than the noise floor threshold to be equal to the noise floor threshold.

In an example embodiment, step 412 is implemented in accordance with the following equation:

$$\hat{S}'_m = \hat{S}_m, \text{ if } \hat{S}_m \geq \beta_{nf} * \overline{E}$$

$$\beta_{nf} * \overline{E}, \text{ else} \quad \text{Equation 17}$$

where $\beta_{nf}$ is a constant. $\beta_{nf}$ may be set to equal 0.0175, for example, though it will be recognized that $\beta_{nf}$ may be any suitable value.

In some example embodiments, one or more steps 402, 404, 406, 408, 410, and/or 412 of flowchart 400 may not be performed. Moreover, steps in addition to or in lieu of steps 402, 404, 406, 408, 410, and/or 412 may be performed. In an embodiment in which steps 402, 404, 406, and 408 are not performed, steps 410 and 412 may be modified to be expressed in terms of the Mel coefficients, rather than the speech estimates. For example, step 410 may be modified to determine a mean frame energy of the third representation of the speech signal, such that the mean frame energy is equal to a sum of the Mel coefficients divided by a number of the Mel coefficients. Step 412 may be modified such that each Mel coefficient that is less than the noise floor threshold is set to be equal to the noise floor threshold. In accordance with this embodiment, the noise floor threshold is equal to the mean frame energy of the third representation multiplied by a designated constant that is less than one.

It will be recognized that Mel noise suppressor 500 may not include one or more of spectral noise estimator 502, ratio determiner 504, gain determiner 506, multiplier 508, mean determiner 510, and/or coefficient updater 512. Furthermore, Mel noise suppressor 500 may include modules in addition to or in lieu of spectral noise estimator 502, ratio determiner 504, gain determiner 506, multiplier 508, mean determiner 510, and/or coefficient updater 512.

It will be recognized that speech recognizer 104 and Mel noise suppressor 108 depicted in FIG. 1; window module 302, conversion module 304, Mel noise suppressor 306, operation module 308, and filtering module 310 depicted in FIG. 3; and spectral noise estimator 502, ratio determiner 504, gain determiner 506, multiplier 508, mean determiner 510, and coefficient updater 512 depicted in FIG. 5 may be implemented in hardware, software, firmware, or any combination thereof For example, speech recognizer 104, Mel noise suppressor 108, window module 302, conversion module 304, Mel noise suppressor 306, operation module 308, filtering module 310, spectral noise estimator 502, ratio determiner 504, gain determiner 506, multiplier 508, mean determiner 510, and/or coefficient updater 512 may be implemented as computer program code configured to be executed in one or more processors.

In another example, speech recognizer 104, Mel noise suppressor 108, window module 302, conversion module 304, Mel noise suppressor 306, operation module 308, filtering module 310, spectral noise estimator 502, ratio determiner 504, gain determiner 506, multiplier 508, mean determiner 510, and/or coefficient updater 512 may be implemented as hardware logic/electrical circuitry.

Figure 6:
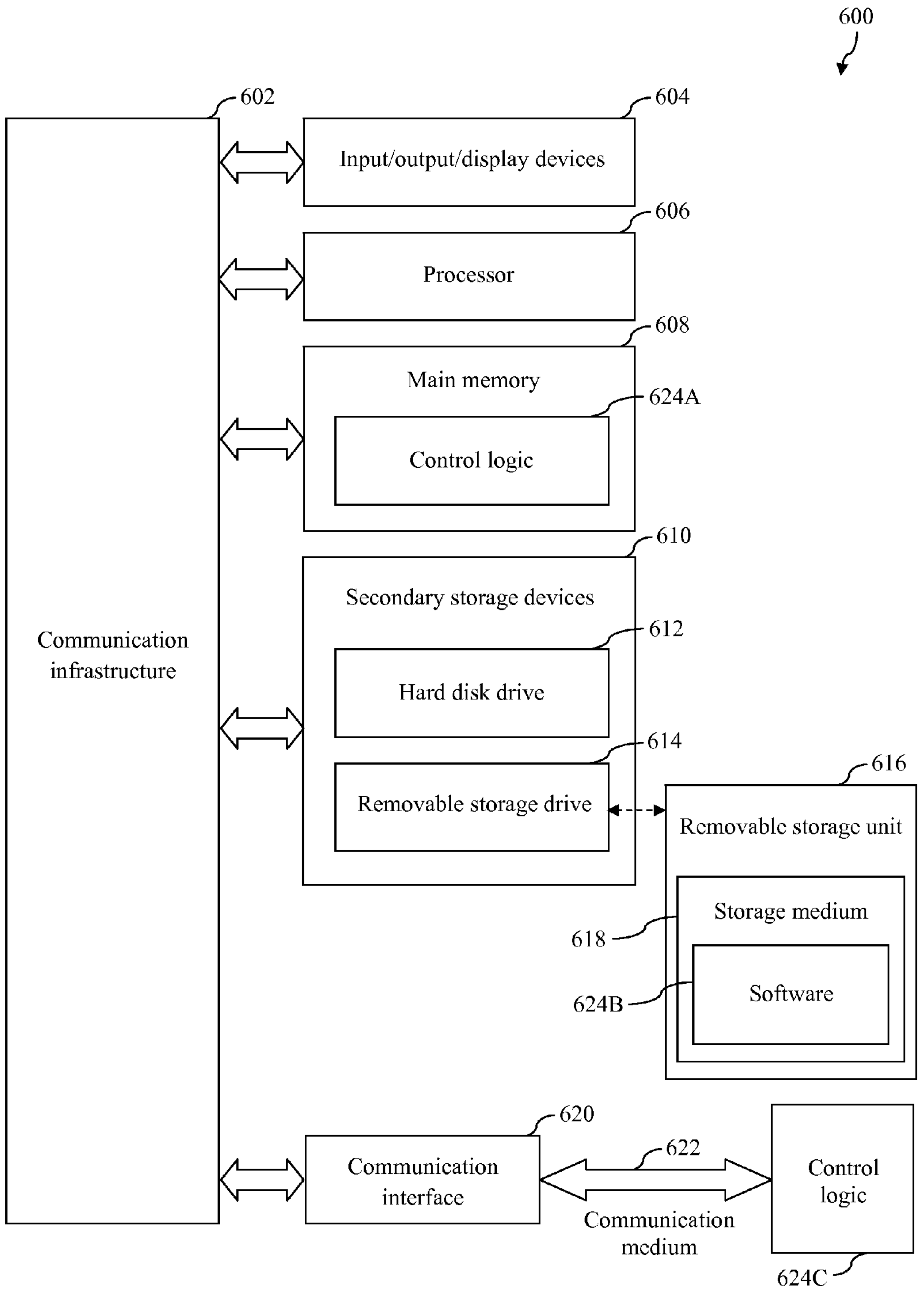
FIG. 6 is a block diagram of a computer in which embodiments may be implemented.

FIG. 6 is a block diagram of a computer 600 in which embodiments may be implemented. For instance, automatic speech recognition system 100, speech recognizer 104, and/or Mel noise suppressor 108 depicted in FIG. 1; speech recognizer 300 (or any elements thereof) depicted in FIG. 3; and/or Mel noise suppressor 500 (or any elements thereof) depicted in FIG. 5 may be implemented using one or more computers, such as computer 600.

As shown in FIG. 6, computer 600 includes one or more processors (e.g., central processing units (CPUs)), such as processor 606. Processor 606 may include speech recognizer 104 and/or Mel noise suppressor 108 of FIG. 1; window module 302, conversion module 304, Mel noise suppressor 306, operation module 308, and/or filtering module 310 of FIG. 3; spectral noise estimator 502, ratio determiner 504, gain determiner 506, multiplier 508, mean determiner 510, and/or coefficient updater 512 of FIG. 5; or any portion or combination thereof, for example, though the scope of the example embodiments is not limited in this respect. Processor 606 is connected to a communication infrastructure 602, such as a communication bus. In some example embodiments, processor 606 can simultaneously operate multiple computing threads.

Computer 600 also includes a primary or main memory 608, such as a random access memory (RAM). Main memory 608 has stored therein control logic 624A (computer software), and data.

Computer 600 also includes one or more secondary storage devices 610. Secondary storage devices 610 include, for example, a hard disk drive 612 and/or a removable storage device or drive 614, as well as other types of storage devices, such as memory cards and memory sticks. For instance, computer 600 may include an industry standard interface, such as a universal serial bus (USB) interface for interfacing with devices such as a memory stick. Removable storage drive 614 represents a floppy disk drive, a magnetic tape drive, a compact disk drive, an optical storage device, tape backup, etc.

Removable storage drive 614 interacts with a removable storage unit 616. Removable storage unit 616 includes a computer useable or readable storage medium 618 having stored therein computer software 624B (control logic) and/or data. Removable storage unit 616 represents a floppy disk, magnetic tape, compact disc (CD), digital versatile disc (DVD), Blue-ray disc, optical storage disk, memory stick, memory card, or any other computer data storage device. Removable storage drive 614 reads from and/or writes to removable storage unit 616 in a well known manner Computer 600 also includes input/output/display devices 604, such as microphones, monitors, keyboards, pointing devices, etc.

Computer 600 further includes a communication or network interface 620. Communication interface 620 enables computer 600 to communicate with remote devices. For example, communication interface 620 allows computer 600 to communicate over communication networks or mediums 622 (representing a form of a computer useable or readable medium), such as local area networks (LANs), wide area networks (WANs), the Internet, cellular networks, etc. Network interface 620 may interface with remote sites or networks via wired or wireless connections.

Control logic 624C may be transmitted to and from computer 600 via the communication medium 622.

Any apparatus or manufacture comprising a computer useable or readable medium having control logic (software) stored therein is referred to herein as a computer program product or program storage device. This includes, but is not limited to, computer 600, main memory 608, secondary storage devices 610, and removable storage unit 616. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, micro-electromechanical systems-based (MEMS-based) storage devices, nanotechnology-based storage devices, as well as other media such as flash memory cards, digital video discs, RAM devices, ROM devices, and the like.

Such computer-readable storage media may store program modules that include computer program logic for speech recognizer 104, Mel noise suppressor 108, window module 302, conversion module 304, Mel noise suppressor 306, operation module 308, filtering module 310, spectral noise estimator 502, ratio determiner 504, gain determiner 506, multiplier 508, mean determiner 510, and/or coefficient updater 512; flowchart 200 (including any one or more steps of flowchart 200) and/or flowchart 400 (including any one or more steps of flowchart 400); and/or further embodiments described herein. Some example embodiments are directed to computer program products comprising such logic (e.g., in the form of program code or software) stored on any computer useable medium. Such program code, when executed in one or more processors, causes a device to operate as described herein.

Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

The invention can be put into practice using software, firmware, and/or hardware implementations other than those described herein. Any software, firmware, and hardware implementations suitable for performing the functions described herein can be used.

III. Conclusion

While various embodiments have been described above, it should be understood that they have been presented by way of example only, and not limitation. It will be understood by those skilled in the relevant arts) that various changes in form and details may be made to the embodiments described herein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method comprising:

applying a window to a first representation of a speech signal in a time domain to provide a windowed representation of the speech signal;

converting the windowed representation of the speech signal in the time domain to a second representation of the speech signal in a frequency domain;

converting the second representation of the speech signal in the frequency domain to a third representation of the speech signal in a filtered spectral domain, wherein the third representation of the speech signal in the filtered spectral domain includes a plurality of Mel coefficients;

performing, by one or more processors, a noise suppression operation with respect to the third representation of the speech signal in the filtered spectral domain to provide a noise-suppressed representation of the speech signal that includes a plurality of noise-suppressed coefficients, wherein the noise suppression operation comprises:

determining a mean frame energy of the third representation of the speech signal, the mean frame energy being equal to a sum of the plurality of Mel coefficients divided by a number of the plurality of Mel coefficients; and for each Mel coefficient of the plurality of Mel coefficients that is less than a noise floor threshold, setting that Mel coefficient to be equal to the noise floor threshold, the noise floor threshold being equal to the mean frame energy multiplied by a designated constant that is less than one.

2. The method of claim 1, further comprising:

performing a logarithmic operation with respect to the plurality of noise-suppressed Mel coefficients to provide a plurality of respective revised coefficients;

truncating the plurality of revised coefficients to provide a truncated plurality of coefficients that includes fewer than all of the plurality of revised coefficients to represent the speech signal; and performing a discrete transform with respect to at least one of the plurality of revised coefficients to de-correlate the plurality of revised coefficients or the truncated plurality of coefficients to de-correlate the truncated plurality of coefficients.

3. The method of claim 2, further comprising:

applying a low-quefrency bandpass exponential cepstral lifter to each coefficient of the truncated plurality of coefficients to provide a liftered representation of the speech signal.

4. The method of claim 2, further comprising:

performing a derivative operation with respect to the truncated plurality of coefficients to provide a plurality of respective first-derivative coefficients;

performing another derivative operation with respect to the plurality of first-derivative coefficients to provide a plurality of respective second-derivative coefficients; and combining the truncated plurality coefficients, the plurality of first-derivative coefficients, and the plurality of second-derivative coefficients to provide a combined plurality of coefficients that represents the speech.

5. The method of claim 1, wherein performing the noise suppression operation comprises:

determining a spectral noise estimate regarding the third representation of the speech signal; and determining a plurality of signal-to-noise ratios that corresponds to the plurality of respective Mel coefficients, each signal-to-noise ratio representing a relationship between the corresponding Mel coefficient and the spectral noise estimate.

6. The method of claim 5, wherein determining the spectral noise estimate comprises:

determining the spectral noise estimate based on a running average of an initial subset of the plurality of Mel coefficients.

7. The method of claim 5, wherein performing the noise suppression operation further comprises:

determining a plurality of gains that corresponds to the plurality of respective Mel coefficients; and multiplying the plurality of gains and the plurality of respective Mel coefficients to provide a plurality of respective speech estimates that represents the speech;

wherein each gain is substantially equal to a fixed maximum gain if the corresponding signal-to-noise ratio is greater than an upper signal-to-noise threshold;

wherein each gain is substantially equal to a fixed minimum gain if the corresponding signal-to-noise ratio is less than a lower signal-to-noise threshold; and wherein each gain is based on a polynomial function of the corresponding signal-to-noise ratio if the corresponding signal-to-noise ratio is less than the upper signal-to-noise threshold and greater than the lower signal-to-noise threshold.

8. The method of claim 7, further comprising:

determining a mean frame energy with respect to the plurality of speech estimates, the mean frame energy being equal to a sum of the plurality of speech estimates divided by a number of the plurality of speech estimates; and for each speech estimate of the plurality of speech estimates that is less than a noise floor threshold, setting that speech estimate to be equal to the noise floor threshold, the noise floor threshold being equal to the mean frame energy multiplied by a designated constant that is less than one.

9. An automatic speech recognition system comprising:

one or more processors; and a memory containing program code, which, when executed by at least one of the one or more processors, is configured to perform operations, the operations comprising:

applying a window to a first representation of a speech signal in a time domain to provide a windowed representation of the speech signal;

converting the windowed representation of the speech signal in the time domain to a second representation of the speech signal in a frequency domain, the conversion module further configured to convert the second representation of the speech signal in the frequency domain to a third representation of the speech signal in a filtered spectral domain, wherein the third representation of the speech signal in the filtered spectral domain includes a plurality of Mel coefficients;

performing a noise suppression operation with respect to the third representation of the speech signal in the filtered spectral domain to provide a noise-suppressed representation of the speech signal that includes a plurality of noise-suppressed coefficients, wherein the noise suppression operation comprises:

determining a mean frame energy of the third representation of the speech signal, the mean frame energy being equal to a sum of the plurality of Mel coefficients divided by a number of the plurality of Mel coefficients; and updating each Mel coefficient of the plurality of Mel coefficients that is less than a noise floor threshold to be equal to the noise floor threshold, the noise floor threshold being equal to the mean frame energy multiplied by a designated constant that is less than one.

10. The automatic speech recognition system of claim 9, the operations further comprising:

a spectral noise estimator configured to determine determining a spectral noise estimate regarding the third representation of the speech signal; and determining a plurality of signal-to-noise ratios that corresponds to the plurality of respective Mel coefficients, each signal-to-noise ratio representing a relationship between the corresponding Mel coefficient and the spectral noise estimate.

11. The automatic speech recognition system of claim 10, wherein the spectral noise estimate is based on a running average of an initial subset of the plurality of Mel coefficients.

12. The automatic speech recognition system of claim 10, the operations further comprising:

determining a plurality of gains that corresponds to the plurality of respective Mel coefficients; and multiplying the plurality of gains and the plurality of respective Mel coefficients to provide a plurality of respective speech estimates that represents the speech;

wherein each gain is substantially equal to a fixed maximum gain if the corresponding signal-to-noise ratio is greater than an upper signal-to-noise threshold;

wherein each gain is substantially equal to a fixed minimum gain if the corresponding signal-to-noise ratio is less than a lower signal-to-noise threshold; and wherein each gain is based on a polynomial function of the corresponding signal-to-noise ratio if the corresponding signal-to-noise ratio is less than the upper signal-to-noise threshold and greater than the lower signal-to-noise threshold.

13. The automatic speech recognition system of claim 12, the operations further comprising:

determining a mean frame energy with respect to the plurality of speech estimates, the mean frame energy being equal to a sum of the plurality of speech estimates divided by a number of the plurality of speech estimates; and updating each speech estimate of the plurality of speech estimates that is less than a noise floor threshold to be equal to the noise floor threshold, the noise floor threshold being equal to the mean frame energy multiplied by a designated constant that is less than one.

14. A computer-readable storage device having computer program logic recorded thereon for enabling a processor-based system to perform noise suppression in a filtered spectral domain, the computer-readable storage device comprising:

a first program logic that enables the processor-based system to apply a window to a first representation of a speech signal in a time domain to provide a windowed representation of the speech signal;

a second program logic that enables the processor-based system to convert the windowed representation of the speech signal in the time domain to a second representation of the speech signal in a frequency domain;

a third program logic that enables the processor-based system to convert the second representation of the speech signal in the frequency domain to a third representation of the speech signal in the filtered spectral domain, wherein the third representation of the speech signal in the filtered spectral domain includes a plurality of Mel coefficients;

a fourth program logic that enables the processor-based system to perform a noise suppression operation with respect to the third representation of the speech signal in the filtered spectral domain to provide a noise-suppressed representation of the speech signal that includes a plurality of noise-suppressed coefficients, wherein the noise suppression operation comprises:

a fifth program logic that enables the processor-based system to determine a mean frame energy of the third representation of the speech signal, the mean frame energy being equal to a sum of the plurality of Mel coefficients divided by a number of the plurality of Mel coefficients; and a sixth program logic that enables the processor-based system to update each Mel coefficient of the plurality of Mel coefficients that is less than a noise floor threshold to be equal to the noise floor threshold, the noise floor threshold being equal to the mean frame energy multiplied by a designated constant that is less than one.

15. The computer-readable storage device of claim 14, wherein the fourth program logic comprises:

first logic that enables the processor-based system to determine a spectral noise estimate regarding the third representation of the speech signal; and second logic that enables the processor-based system to determine a plurality of signal-to-noise ratios that corresponds to the plurality of respective Mel coefficients, each signal-to-noise ratio representing a relationship between the corresponding Mel coefficient and the spectral noise estimate.

16. The computer-readable storage device of claim 15, wherein the spectral noise estimate is based on a running average of an initial subset of the plurality of Mel coefficients.

17. The computer-readable storage device of claim 15, wherein the fourth program logic further comprises:

third logic that enables the processor-based system to determine a plurality of gains that corresponds to the plurality of respective Mel coefficients; and fourth logic that enables the processor-based system to multiply the plurality of gains and the plurality of respective Mel coefficients to provide a plurality of respective speech estimates that represents the speech;

wherein each gain is substantially equal to a fixed maximum gain if the corresponding signal-to-noise ratio is greater than an upper signal-to-noise threshold;

wherein each gain is substantially equal to a fixed minimum gain if the corresponding signal-to-noise ratio is less than a lower signal-to-noise threshold; and wherein each gain is based on a polynomial function of the corresponding signal-to-noise ratio if the corresponding signal-to-noise ratio is less than the upper signal-to-noise threshold and greater than the lower signal-to-noise threshold.

18. The computer-readable storage device of claim 17, further comprising:

a seventh program logic that enables the processor-based system to determine a mean frame energy with respect to the plurality of speech estimates, the mean frame energy being equal to a sum of the plurality of speech estimates divided by a number of the plurality of speech estimates; and an eighth program logic that enables the processor-based system to update each speech estimate of the plurality of speech estimates that is less than a noise floor threshold to be equal to the noise floor threshold, the noise floor threshold being equal to the mean frame energy multiplied by a designated constant that is less than one.

19. The automatic speech recognition system of claim 9, the operations further comprising:

performing a logarithmic operation with respect to the plurality of noise-suppressed coefficients to provide a plurality of respective revised coefficients;

truncating the plurality of revised coefficients to provide a truncated plurality of coefficients that includes fewer than all of the plurality of revised coefficients to represent the speech signal; and performing a discrete transform with respect to at least one of the plurality of revised coefficients to de-correlate the plurality of revised coefficients or the truncated plurality of coefficients to de-correlate the truncated plurality of coefficients.

20. The computer program storage device of claim 14, further comprising:

a seventh program logic that enables the processor-based system to perform a logarithmic operation with respect to the plurality of noise-suppressed coefficients to provide a plurality of respective revised coefficients;

a eighth program logic that enables the processor-based system to truncate the plurality of revised coefficients to provide a truncated plurality of coefficients that includes fewer than all of the plurality of revised coefficients to represent the speech signal; and a ninth program logic that enables the processor-based system to a discrete transform with respect to at least one of the plurality of revised coefficients to de-correlate the plurality of revised coefficients or the truncated plurality of coefficients to de-correlate the truncated plurality of coefficients.

* * * * *

UNITED STATES PATENT AND TRADEMARK OFFICE

CERTIFICATE OF CORRECTION

PATENT NO. : 8,942,975 B2
APPLICATION NO. : 13/069089
DATED : January 27, 2015
INVENTOR(S) : Jonas Borgstrom It is certified that error appears in the above-identified patent and that said Letters Patent is hereby corrected as shown below:

In the Claims

In column 18, line 10, in claim 20, delete “computer program storage device” and insert -- computer-readable storage device --, therefor.

Signed and Sealed this
Ninth Day of June, 2015

Michelle K. Lee
*Director of the United States Patent and Trademark Office*